(12) United States Patent
Tsuchimochi

(10) Patent No.: US 7,502,180 B2
(45) Date of Patent: Mar. 10, 2009

(54) IMAGE-FORMATION OPTICAL SYSTEM AND IMAGING SYSTEM USING THE SAME

(75) Inventor: Yuichi Tsuchimochi, Shibuya-ku (JP)

(73) Assignee: Olympus Imaging Corp., Tokyo (JP)

( * ) Notice: Subject to any disclaimer, the term of this patent is extended or adjusted under 35 U.S.C. 154(b) by 0 days.

(21) Appl. No.: 11/983,359

(22) Filed: Nov. 7, 2007

(65) Prior Publication Data
US 2008/0151393 A1     Jun. 26, 2008

(30) Foreign Application Priority Data
Dec. 22, 2006  (JP)  ............................. 2006-346035

(51) Int. Cl.
*G02B 13/02* (2006.01)
(52) U.S. Cl. .................. 359/749; 359/750; 359/751; 359/752; 359/753; 359/740; 359/770
(58) Field of Classification Search ......... 359/749–753, 359/740, 770
See application file for complete search history.

(56) References Cited
U.S. PATENT DOCUMENTS 4,403,837 A * 9/1983 Nakahashi .................. 359/770
5,255,121 A * 10/1993 Suzuki ........................ 359/643
5,682,269 A * 10/1997 Kimura et al. .............. 359/770
5,684,635 A * 11/1997 Sugawara .................... 359/643
5,963,381 A * 10/1999 Ori ............................. 359/763
2001/0004301 A1* 6/2001 Kodama et al. ............. 359/643

FOREIGN PATENT DOCUMENTS

| JP | 4-68307 | 3/1992 |
|---|---|---|
| JP | 2002-72085 | 3/2002 |
| JP | 2002-303789 | 10/2002 |

* cited by examiner

*Primary Examiner*—Evelyn A. Lester
(74) *Attorney, Agent, or Firm*—Kenyon & Kenyon LLP

(57) ABSTRACT

The invention relates to a compact image-formation optical system that is diminished in a diametrical direction with as few lenses as possible while well adapting to an wide-angle arrangement having a half angle of 90° or greater, and an imaging system incorporating the same. The image-formation optical system comprises, in order from its object side, a first lens L1 that is a negative lens, a second lens L2 that is a meniscus lens concave on its object side, an apertures stop S, and a lens group G having positive refracting power.

11 Claims, 5 Drawing Sheets

IMAGE-FORMATION OPTICAL SYSTEM AND IMAGING SYSTEM USING THE SAME

This application claims benefits of Japanese Application No. 2006-346035 filed in Japan on Dec. 22, 2006, the contents of which are incorporated herein by this reference.

BACKGROUND OF THE INVENTION

The present invention relates generally to an image-formation optical system well fit for use with imaging systems using solid-state imaging devices such as CCDs or CMOSs, and more particularly to an image-formation optical system used with onboard cameras, surveillance cameras, digital cameras and digital video cameras as well as small-format cameras mounted on cellular phones, personal computers, etc., and an imaging system that incorporates the same.

In recent years, cars with onboard cameras have begun to catch on. And early onboard cameras have been used primarily for visual identification; in more recent years, however, they have taken the form of more intelligent sensor cameras taking aim at sensing white lines, monitoring whether or not cars stay on lanes, finding something abnormal, and keeping watch on drivers. Requirements for optical systems used with such cameras are: a wide angle of view, specifically a half angle of view of 90° or greater to get rid of any dead angle, higher image quality, and a compact, low-cost arrangement comprising fewer lenses. Fisheye optical systems are thus now used.

Some prior art fisheye optical systems comprising fewer lenses, say, six lenses are available, as set forth in Patent Publications 1 and 2.

However, the prior arts disclosed there are found to have the following problems.

Although the prior arts have a half angle of 90° or greater with a relatively small number of lenses, say, six lenses, yet the optical effective diameter of the first lens grows large with respect to image height. Consequently, the fabrication cost of the first lens soars and it is difficult to reduce the whole size of the system.

In general, for a wide-angle optical system there is a retrofocus type used that comprises, in order from its object side, a lens group having negative refracting power and a lens group having positive refracting power. When such an optical system is used at a superwide-angle supposed to be 90° or greater in the half angle of view, it has to have a short focal length. In other words, it is required that the power of the lens group having negative refracting power be strengthened to shift the principal point position to an image plane side. As the power of the lens group having negative refracting power grows strong, there will be a lot more aberrations occurring such as field curvature and astigmatism.

To stave off such aberrations, the front group of negative refracting power is generally made up of a plurality of lenses thereby dispersing and reducing them. To this end, it is general that two negative lenses be put one upon another, as set forth typically in Patent Publication 1.

However, the aforesaid optical system, because of comprising a lot more optical lenses, has a longer whole length. The fisheye lens of the retrofocus type constructed as described above, because of an increased optical effective diameter of the front group lens, ends up with increased lens diameter, and high prices as well.

Patent Publication 1
U.S. Pat. No. 2,992,547
Patent Publication 2
JP(A)2002-72085

SUMMARY OF THE INVENTION

In consideration of such problems with the prior art as briefed above, the primary object of the invention is to provide a compact image-formation optical system that is diminished in a diametrical direction with as few lenses as possible while well adapting to a wide-angle arrangement having a half angle of view of at least 90°, and an imaging system incorporating the same.

According to the invention, the aforesaid object is achievable by the provision of an image-formation optical system, characterized by comprising, in order from an object side thereof, a first lens that is a negative lens, a second lens that is a meniscus lens concave on its object side, an aperture stop and a lens group that has positive refracting power.

The advantages of, and the requirements for, the aforesaid arrangement of the invention are now explained.

In general, a retrofocus type wide-angle lens has a first lens of negative refracting power likely to grow considerably large in optical effective diameter. To make that optical effective diameter of the first lens small is achieved by:

1. locating the entrance pupil in front, and
2. strengthening the negative refracting power of the first lens.

To position the entrance pupil in front, the lens group of negative refracting power is made up of the first lens alone, and the surface of the second lens on its object side is configured as being concave on the object side. This ensures that the entrance pupil is located in front to lower off-axis light beams, making the optical effective diameter of the first lens small. The lowering of the off-axis light beams also works for reducing the chromatic aberration of magnification of the first lens.

For the optical system of the invention it is preferable to satisfy the following condition (1).

$$-0.2 \leq 2 \times Ih/Exp < 0 \tag{1}$$

Here Ih is the maximum image height, and
Exp is the distance from an image plane to an exit pupil.

Condition (1) is the requirement for the image-formation optical system of the invention to make sure telecentric capability. As the exit pupil is not far away from the image plane, it will cause the angle of incidence of an off-axis light beam to grow large. Especially when the optical system of the invention is used as an onboard camera, rim images at a large angle of incidence could not be well detected, and if somewhat detected, their quantity of light could drop, because a CCD or the like is used for the detection of such images.

Falling short of the lower limit of −0.5 to condition (1) will cause the exit pupil to be too close to the image plane, bringing telecentric performance out of balance. Exceeding the upper limit of 0 to condition (1) will cause the lens group of positive refracting power in the rear of the stop to grow large in optical effective diameter.

It is then preferable to locate a positive lens nearest to the image side of the optical system, wherein the positive lens satisfies the following condition (2).

$$0.2 \leq Dsp/L \leq 0.5 \tag{2}$$

Here Dsp is the distance between the aperture stop and the image-side surface of the positive lens located nearest to the image side of the optical system, and L is the distance from the object-side surface of the first lens to the image plane.

To satisfy condition (1) so that the exit pupil is positioned well away from the image plane, it is effective to stay the positive lens located nearest to the image side away from the aperture stop. As the lower limit of 0.2 to condition (2) is not reached, it will make correction of aberrations difficult because of the need of raising the positive refracting power of the positive lens located nearest to the image side. As the upper limit of 0.5 to condition (2) is exceeded, it will cause the whole length of the optical system to grow too long.

It is also preferable that a positive lens is located nearest to the image side, and there is at least one positive lens interposed between the aperture stop and said positive lens. Thus, by locating the positive lens between the aperture stop and the positive lens nearest to the image side, it is then possible to make good correction of axial spherical aberration and coma.

It is further preferable that a positive lens is located nearest to the image side, and at least one positive lens and a negative lens are interposed between the aperture stop and said positive lens. Thus, if a positive lens and a negative lens are interposed as lenses for correction of chromatic aberrations between the stop and the positive lens located nearest to the image side, it is then possible to correct longitudinal chromatic aberration and chromatic aberration of magnification in a well-balanced state.

It is more preferable for the optical system of the invention to satisfy the following conditions (3) and (4).

$$3.0 \leq D_{r1r4}/Ih \leq 6.0 \quad (3)$$

$$1.5 \leq D_{r1r3}/Ih \leq 3.0 \quad (4)$$

Here $D_{r1r3}$ is the distance from the object-side surface of the first lens to the object-side surface of the second lens, $D_{r1r4}$ is the distance from the object-side surface of the first lens to the image-side surface of the second lens, and Ih is the maximum image height.

According to the invention wherein the object-side surface of the second lens is configured as a concave one, not only can the negative refracting power of the first lens be slacked up, but also correction of aberrations such as astigmatism, distortion and coma in particular is facilitated, because its curvature is opposite to that of the image-side surface of the first lens. In addition, the positive power of the image-side curved surface of the second lens that is convex on the image plane ensures to set up a retrofocus optical system, the positive power surface of which works for well-balanced correction of axial and off-axis aberrations.

In other words, when $D_{r1r4}/Ih \leq 3.0$ (3)-1, the image-side surface of the second lens is too close to the first lens; the curvature of the image-side surface of the second lens grows tight, rendering correction of aberrations difficult. When $D_{r1r4}/Ih \geq 6.0$ (3)-2, the image-side surface of the second lens is too away from the first lens; the whole length of the second lens grows long. When $D_{r1r3}/Ih \leq 1.5$ (4)-1, the object-side surface of the second lens is too close to the first lens, resulting in the inability of fabricate the optical system, or any wide-angle arrangement cannot be achieved because there is the need of forcibly slacking up the curvature of the image-side surface of the first lens so as not to engage the second lens. When $D_{r1r3}/Ih \geq 3.0$ (4)-2, the object-side surface of the second lens is too away from the first lens; correction of aberrations becomes difficult.

It is also preferable to satisfy the following condition (5).

$$0.5 \leq |r_3/r_4| \leq 1.4 \quad (5)$$

Here $r_3$ is the radius of curvature of the object-side surface of the second lens, and $r_4$ is the radius of curvature of the image-side surface of the second lens.

As the positive power of the image-side surface of the second lens is too strong, it will have a lot more astigmatism and coma to occur around the image-side surface of the second lens. As the positive power of the image-side surface is too weak, on the contrary, there will be the need of spacing the image-side surface of the second lens away from the first lens, because the principal point spacing between the first lens and the second lens grows wide.

For this reason, it is desired that the negative power of the object-side surface and the positive power of the image-side surface of the aforesaid second lens come within the predetermined constant range.

In other words, when $|r_3/r_4|<0.5$ (5)-1, the power of the image-side surface of the second lens becomes weak; this must be compensated for by making the second lens thick. When $|r_3/r_4|>1.5$ (5)-2, the power of the image-side surface of the second lens grows strong; there will be a lot more astigmatism and coma occurring due to off-axis rays at the image-side surface of the second lens.

It is more preferable to reduce condition (5) down to (5').

$$0.6 \leq r_3/r_4 \leq 1.4 \quad (5')$$

Further, it is more preferable to satisfy the following condition (6).

$$n_2 \geq 1.75 \quad (6)$$

Here $n_2$ is the d-line refractive index of the second lens.

As the refractive index of the second lens remains low, the positive power will run short, and the curvature of the image-side surface of the second lens will grow tight, rendering correction of astigmatism and coma due to off-axis rays difficult. In addition, the second lens will grow thick, resulting in an increase in the whole length of the optical system.

It is here more preferable to reduce condition (6) down to (6').

$$n_2 \geq 1.80 \quad (6')$$

It is also preferable to satisfy the following conditions (7) and (8).

$$-4.0 \leq f_1/f \leq -1.0 \quad (7)$$

$$n_1 \geq 1.75 \quad (8)$$

Here $f_1$ is the focal length of the first lens, f is the focal length of the whole image-formation optical lens system, and $n_1$ is the d-line refractive index of the first lens.

In the invention, although aberrations produced at the first lens of negative refracting power are corrected at the lens group of positive refracting power, yet astigmatism, coma, field curvature, etc. produced grow too much to correct them at the lens group in the rear. As the power of the first lest becomes weak, on the other hand, it will cause the lens to increase in optical effective diameter or the whole length of the optical system to grow long.

In other words, when $f_1/f<-4.0$ (7)-1, the optical effective diameter, and the whole length of the optical system grows large. When $f_1/f>-1.0$ (7)-2, astigmatism, coma and field curvature grow too much to correct them.

More preferably, the aforesaid condition (7) should be reduced down to $$-3.5 \leq f_1/f \leq -1.5 \quad (7')$$

Reference is here made to why condition (8) must be satisfied. If the first lens is allowed to have a high refractive index, it is then possible to slack up the curvature of the image-side surface of the first lens in particular, thereby holding back the occurrence of aberrations, and improving the ability of the lens to be processed as well.

More preferably, condition (8) should be reduced down to $$n_1 \geq -1.80 \quad (8')$$

It is also preferable to satisfy the following condition (9):

$$-30.0 \leq f_{1-2}/f \leq -3.0 \quad (9)$$

Here $f_{1-2}$ is the combined focal length of the first lens and the second lens, and f is the focal length of the whole image-formation optical system.

In the optical system of the invention, the first lens, and the second lens, each located on the object side with respect to the stop, has negative refracting power. As the powers of the first and the second lens strengthen, aberrations such as astigmatism, coma and field curvature will occur in too large amounts to be corrected by the positive lens group located on the image side with respect to the stop. As the powers of the first and the second lens wane, on the other hand, the optical effective diameter of each lens will grow large or the whole length of the optical system will grow long.

In other words, when $f_{1-2}/f<-30.0$ (9)-1, the optical effective diameter and the whole length of the optical system alike grow large. When $F_{1-2}/f>-3.0$ (9)-2, astigmatism, coma and field curvature are produced in too large amounts for correction.

Thus, the present invention provides a compact, low-cost image-formation optical system that is diminished in a diametrical direction with as few lenses as possible while well adapting to a wide-angle arrangement having a half angle of view of 90° or greater. The present invention also provides an imaging system that is easily made compact by comprising such an image-formation optical system. Further, the present invention provides an image-formation optical system that, by tweaking or otherwise contriving the respective lenses, facilitates size reductions, and makes sure aberration performance and zoom ratios, and an imaging system that incorporates the same.

Still other objects and advantages of the invention will in part be obvious and will in part be apparent from the specification.

The invention accordingly comprises the features of construction, combinations of elements, and arrangement of parts that will be exemplified in the construction hereinafter set forth, and the scope of the invention will be indicated in the claims.

DESCRIPTION OF THE PREFERRED EMBODIMENTS

Figure 1:
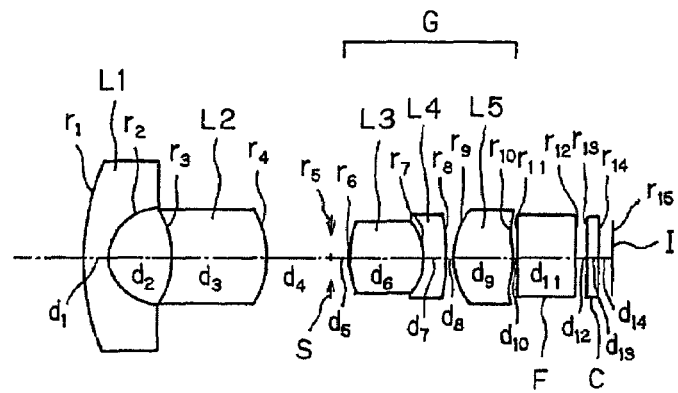
FIG. 1 is illustrative in lens arrangement section of Example 1 of the image-formation optical system according to the invention.
Figure 2:
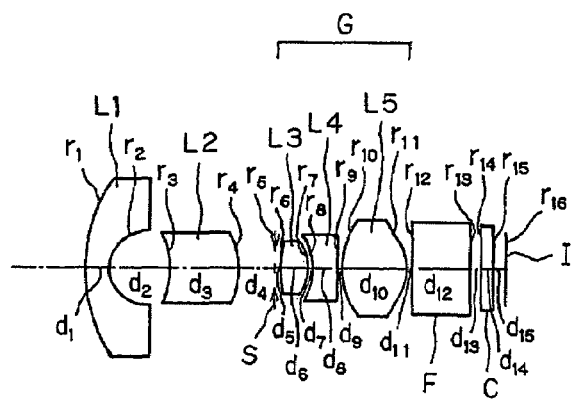
FIG. 2 is illustrative in lens arrangement section of Example 2 of the image-formation optical system according to the invention.
Figure 3:
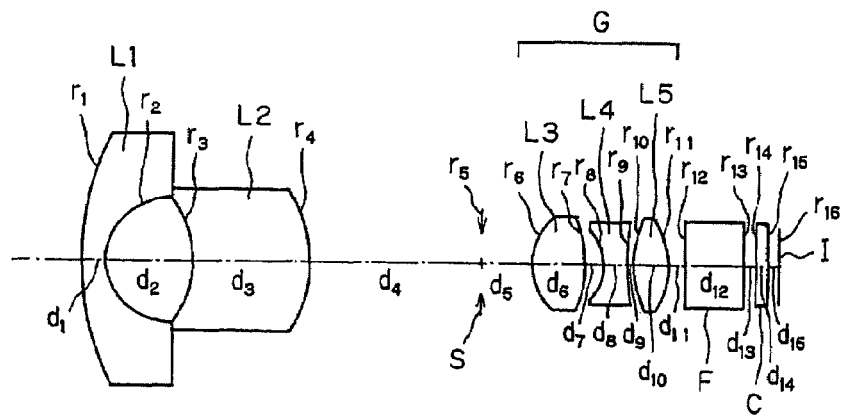
FIG. 3 is illustrative in lens arrangement section of Example 3 of the image-formation optical system according to the invention.

The image-formation optical system of the invention is now explained with reference to Examples 1, 2 and 3. FIGS. 1, 2 and 3 are illustrative in lens arrangement section of the image-formation optical systems of Examples 1, 2 and 3, respectively. In FIGS. 1, 2 and 3, L1 stands for the first lens, L2 the second lens, S the aperture stop, G the lens group, F an optical low-pass filter, C a cover glass for a CCD that is an electronic imaging device, and I the image plane of CCD. Note here that regarding a near infrared sharp cut coating, for instance, it may be applied directly on the optical low-pass filter F, or there may be another infrared cut absorption filter provided.

EXAMPLE 1

As shown in FIG. 1, Example 1 is directed to an image-formation optical system is made up of, in order from an object side thereof, the first lens L1 that is a negative meniscus lens convex on its object side, the second lens L2 that is a positive meniscus lens concave on its object side, the aperture stop S, the lens group G, the low-pass filter F having an IR cut coating surface, and the cover glass C. The lens group G is made up of, in order from its object side, a cemented lens of a third lens L3 that is a double-convex positive lens and a fourth lens L4 that is a negative meniscus lens concave on its object side, and a fifth lens L5 that is a double-convex positive lens having both aspheric surfaces. The fifth lens L5 is formed of an amorphous polyolefin resin. The wide-angle optical system of this example has the specifications: a focal length f of 1.306 mm, an F-number $F_{no}$ of 2.4, a half angle of view $\omega$ of 91°, and a maximum image height Ih of 1.8 mm.

EXAMPLE 2

As shown in FIG. 2, Example 2 is directed to an image-formation optical system is made up of, in order from an object side thereof, the first lens L1 that is a negative meniscus lens convex on its object side, the second lens L2 that is a positive meniscus lens concave on its object side, the aperture stop S, the lens group G, the low-pass filter F having an IR cut coating surface, and the cover glass C. The lens group G is made up of, in order from its object side, a third lens L3 that is a double-convex positive lens, a fourth lens L4 that is a negative meniscus lens concave on its object side, and a fifth lens L5 that is a double-convex positive lens having both aspheric surfaces. The fifth lens L5 is formed of an amorphous polyolefin resin. The wide-angle optical system of this example has the specifications: a focal length f of 1.48 mm, an F-number $F_{no}$ of 2.4, a half angle of view $\omega$ of 91°, and a maximum image height Ih of 1.8 mm.

EXAMPLE 3

As shown in FIG. 3, Example 3 is directed to an image-formation optical system is made up of, in order from an object side thereof, the first lens L1 that is a negative meniscus lens convex on its object side, the second lens L2 that is a negative meniscus lens concave on its object side, the aperture stop S, the lens group G, the low-pass filter F having an IR cut coating surface, and the cover glass C. The lens group G is made up of, in order from its object side, a third lens L3 that is a double-convex positive lens, a fourth lens L4 that is a double-concave negative lens, and a fifth lens L5 that is a double-convex positive lens having both aspheric surfaces. The fifth lens L5 is formed of an amorphous polyolefin resin. The wide-angle optical system of this example has the specifications: a focal length f of 1.48 mm, an F-number $F_{no}$ of 2.4, a half angle of view ω of 91°, and a maximum image height Ih of 1.8 mm.

Numerical data about each of Examples 1, 2 and 3 are enumerated below. The symbols used hereinafter but not hereinbefore have the following meanings.

$r_1, r_2 \ldots$ : radius of curvature of each lens surface, $d_1, d_2 \ldots$ : space between adjacent lens surfaces, $n_{d1}, n_{d2} \ldots$ : d-line refractive index of each lens, $v_{d1}, v_{d2} \ldots$ : Abbe number of each lens, $Y_1, Y_2 \ldots$ : optical effective radius.

Here let Z be coordinates in the axial optical direction, Y be coordinates in a direction vertical to the optical axis. Then, using the respective aspheric coefficients in the respective examples, aspheric shape is given by $$Z=(Y^2/r)/[1+\{1-(K+1)\cdot(Y/r)^2\}^{1/2}]+A_4Y^4+A_6Y^6+A_8Y^8+A_{10}Y^{10}$$

where r is a paraxial radius of curvature, K is a conical coefficient, and $A_4, A_6, A_8$ and $A_{10}$ are the $4^{th}$-, $6^{th}$-, $8^{th}$-, and $10^{th}$-order aspheric coefficients, respectively.

EXAMPLE 1

| | | | | |
|---|---|---|---|---|
| $r_1 = 12.560$ | $d_1 = 1.00$ | $n_{d1} = 1.88300$ | $v_{d1} = 40.80$ | $Y_1 = 4.4625$ |
| $r_2 = 2.200$ | $d_2 = 2.77$ | | | $Y_2 = 2.1449$ |
| $r_3 = -4.464$ | $d_3 = 4.00$ | $n_{d2} = 1.92286$ | $v_{d2} = 18.90$ | $Y_3 = 1.9100$ |
| $r_4 = -5.057$ | $d_4 = 2.74$ | | | $Y_4 = 2.1486$ |
| $r_5 = \infty$ (Stop) | $d_5 = 0.82$ | | | $Y_5 = 0.9682$ |
| $r_6 = 7.864$ | $d_6 = 3.15$ | $n_{d3} = 1.58313$ | $v_{d3} = 59.38$ | $Y_6 = 1.2143$ |
| $r_7 = -2.860$ | $d_7 = 1.00$ | $n_{d4} = 1.92286$ | $v_{d4} = 18.90$ | $Y_7 = 1.5692$ |
| $r_8 = -8.963$ | $d_8 = 0.20$ | | | $Y_8 = 1.8531$ |
| $r_9 = 4.239$ | $d_9 = 2.60$ | $n_{d5} = 1.52542$ | $v_{d5} = 55.78$ | $Y_9 = 2.1000$ |
| (Aspheric) | | | | |
| $r_{10} = -5.934$ | $d_{10} = 0.20$ | | | $Y_{10} = 1.8739$ |
| (Aspheric) | | | | |
| $r_{11} = \infty$ | $d_{11} = 2.50$ | $n_{d6} = 1.54771$ | $v_{d6} = 62.84$ | $Y_{11} = 1.8676$ |
| $r_{12} = \infty$ | $d_{12} = 0.50$ | | | $Y_{12} = 1.8334$ |
| $r_{13} = \infty$ | $d_{13} = 0.50$ | $n_{d7} = 1.51633$ | $v_{d7} = 64.14$ | $Y_{13} = 1.8230$ |
| $r_{14} = \infty$ | $d_{14} = 0.50$ | | | $Y_{14} = 1.8162$ |
| $r_{15} = \infty$ | | | | $Y_{15} = 1.8059$ |
| (Image Plane) | | | | |

Aspherical Coefficients

9th surface

K = -2.2388
$A_4 = 4.24507 \times 10^{-3}$
$A_6 = 1.48443 \times 10^{-3}$
$A_8 = -1.29917 \times 10^{-4}$
$A_{10} = 1.19586 \times 10^{-5}$ 10th surface K = -3.791
$A_4 = 2.57583 \times 10^{-3}$
$A_6 = 4.28150 \times 10^{-3}$
$A_8 = -1.08079 \times 10^{-3}$
$A_{10} = 2.25792 \times 10^{-4}$

EXAMPLE 2

| | | | | |
|---|---|---|---|---|
| $r_1 = 8.343$ | $d_1 = 1.00$ | $n_{d1} = 1.88300$ | $v_{d1} = 40.80$ | $Y_1 = 4.2718$ |
| $r_2 = 1.782$ | $d_2 = 2.66$ | | | $Y_2 = 1.7815$ |
| $r_3 = -4.389$ | $d_3 = 3.00$ | $n_{d2} = 1.92286$ | $v_{d2} = 18.90$ | $Y_3 = 1.5546$ |
| $r_4 = -4.012$ | $d_4 = 1.50$ | | | $Y_4 = 1.6208$ |
| $r_5 = \infty$ (Stop) | $d_5 = 0.25$ | | | $Y_5 = 0.8138$ |
| $r_6 = 7.081$ | $d_6 = 1.20$ | $n_{d3} = 1.54771$ | $v_{d3} = 62.84$ | $Y_6 = 0.9440$ |
| $r_7 = -2.463$ | $d_7 = 0.20$ | | | $Y_7 = 1.1244$ |
| $r_8 = -2.538$ | $d_8 = 1.00$ | $n_{d4} = 1.92286$ | $v_{d4} = 18.90$ | $Y_8 = 1.1366$ |
| $r_9 = -158.015$ | $d_9 = 0.20$ | | | $Y_9 = 1.4700$ |
| $r_{10} = 3.505$ | $d_{10} = 2.80$ | $n_{d5} = 1.52542$ | $v_{d5} = 55.78$ | $Y_{10} = 1.8927$ |
| (Aspheric) | | | | |
| $r_{11} = -2.393$ | $d_{11} = 0.20$ | | | $Y_{11} = 2.0629$ |
| (Aspheric) | | | | |
| $r_{12} = \infty$ | $d_{12} = 2.50$ | $n_{d6} = 1.54771$ | $v_{d6} = 62.84$ | $Y_{12} = 2.0005$ |
| $r_{13} = \infty$ | $d_{13} = 0.50$ | | | $Y_{13} = 1.8929$ |
| $r_{14} = \infty$ | $d_{14} = 0.50$ | $n_{d7} = 1.51633$ | $v_{d7} = 64.14$ | $Y_{14} = 1.8602$ |
| $r_{15} = \infty$ | $d_{15} = 0.50$ | | | $Y_{15} = 1.8387$ |
| $r_{16} = \infty$ | | | | $Y_{16} = 1.8060$ |
| (Image Plane) | | | | |

Aspherical Coefficients

10th surface

K = -4.6170
$A_4 = -9.49294 \times 10^{-4}$
$A_6 = 1.14267 \times 10^{-3}$
$A_8 = 1.56300 \times 10^{-4}$
$A_{10} = -2.55739 \times 10^{-5}$ 11th surface K = -0.7362
$A_4 = 5.97480 \times 10^{-3}$
$A_6 = 7.06325 \times 10^{-4}$
$A_8 = -1.70964 \times 10^{-4}$
$A_{10} = 5.45160 \times 10^{-5}$

EXAMPLE 3

| | | | | |
|---|---|---|---|---|
| $r_1 = 14.652$ | $d_1 = 1.00$ | $n_{d1} = 1.83400$ | $v_{d1} = 37.20$ | $Y_1 = 6.0412$ |
| $r_2 = 2.945$ | $d_2 = 3.84$ | | | $Y_2 = 2.9168$ |
| $r_3 = -4.900$ | $d_3 = 5.00$ | $n_{d2} = 1.84666$ | $v_{d2} = 23.80$ | $Y_3 = 2.7085$ |
| $r_4 = -7.200$ | $d_4 = 7.29$ | | | $Y_4 = 3.2825$ |
| $r_5 = \infty$ (Stop) | $d_5 = 2.16$ | | | $Y_5 = 1.3533$ |
| $r_6 = 3.023$ | $d_6 = 2.41$ | $n_{d3} = 1.54771$ | $v_{d3} = 62.84$ | $Y_6 = 2.0833$ |
| $r_7 = -5.915$ | $d_7 = 0.75$ | | | $Y_7 = 1.8842$ |
| $r_8 = -2.749$ | $d_8 = 1.00$ | $n_{d4} = 1.84666$ | $v_{d4} = 23.80$ | $Y_8 = 1.6322$ |
| $r_9 = 23.874$ | $d_9 = 0.20$ | | | $Y_9 = 1.8525$ |
| $r_{10} = 3.881$ | $d_{10} = 1.55$ | $n_{d5} = 1.52542$ | $v_{d5} = 55.78$ | $Y_{10} = 2.0335$ |
| (Aspheric) | | | | |
| $r_{11} = -4.097$ | $d_{11} = 0.73$ | | | $Y_{11} = 2.1000$ |
| (Aspheric) | | | | |
| $r_{12} = \infty$ | $d_{12} = 2.50$ | $n_{d6} = 1.54771$ | $v_{d6} = 62.84$ | $Y_{12} = 2.0194$ |
| $r_{13} = \infty$ | $d_{13} = 0.50$ | | | $Y_{13} = 1.9165$ |
| $r_{14} = \infty$ | $d_{14} = 0.50$ | $n_{d7} = 1.51633$ | $v_{d7} = 64.14$ | $Y_{14} = 1.8852$ |
| $r_{15} = \infty$ | $d_{15} = 0.50$ | | | $Y_{15} = 1.8646$ |

-continued

| | |
|---|---|
| $r_{16} = \infty$ (Image Plane) | $Y_{16} = 1.8401$ |

Aspherical Coefficients

Figure 4:
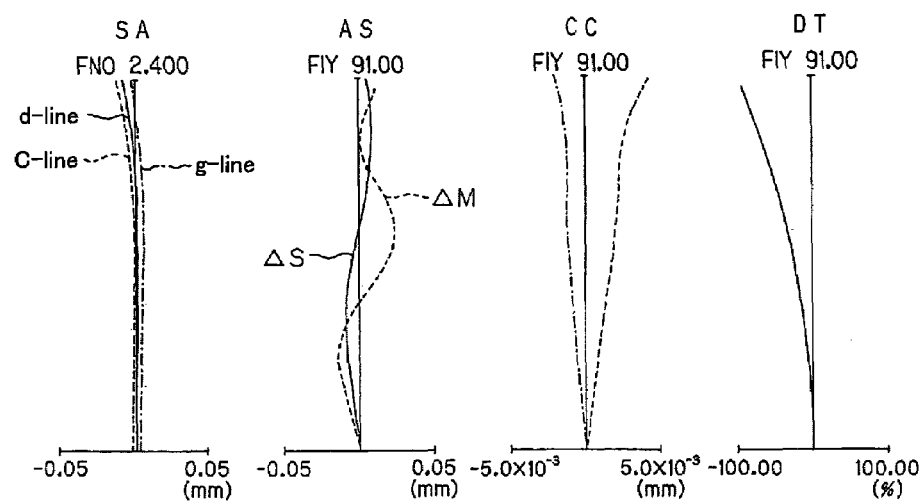
FIG. 4 is an aberration diagram for Example 1.
Figure 5:
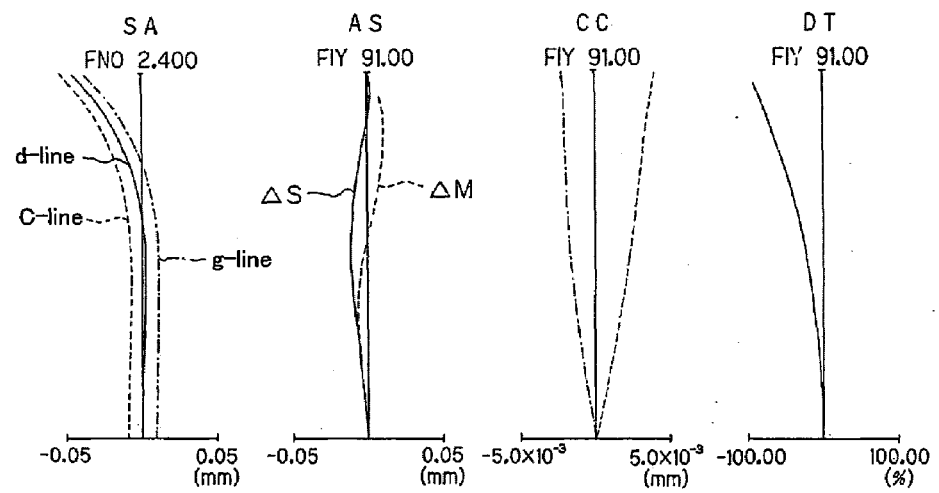
FIG. 5 is an aberration diagram for Example 2.
Figure 6:
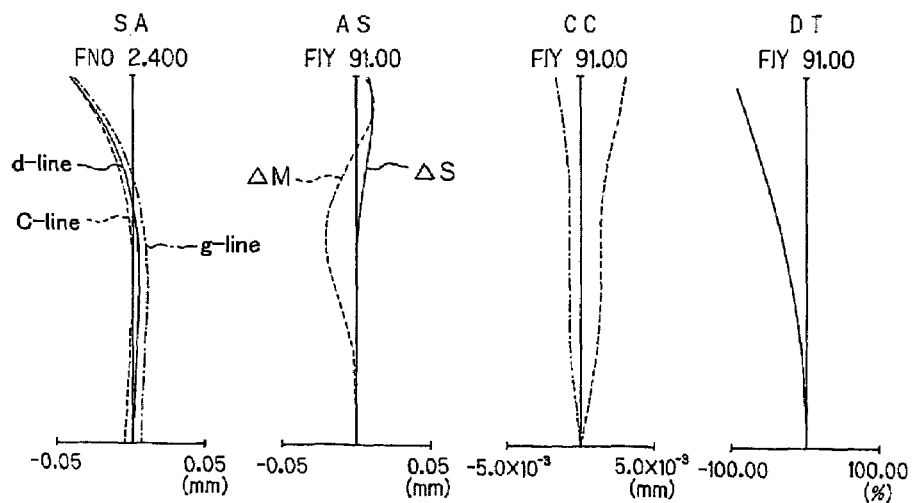
FIG. 6 is an aberration diagram for Example 3.
Figure 7:
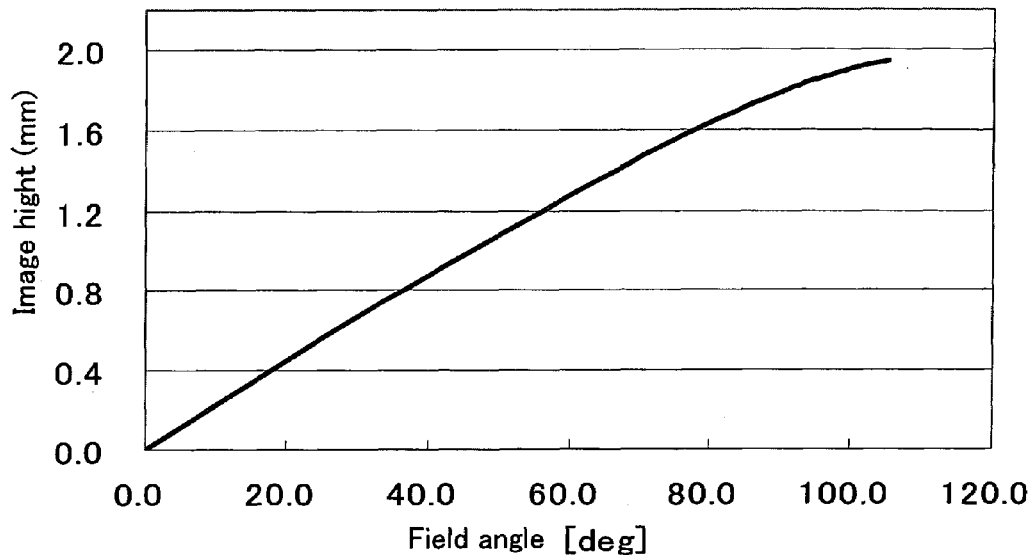
FIG. 7 is illustrative of an angle of view (field angle) vs. image height in Example 1.
Figure 8:
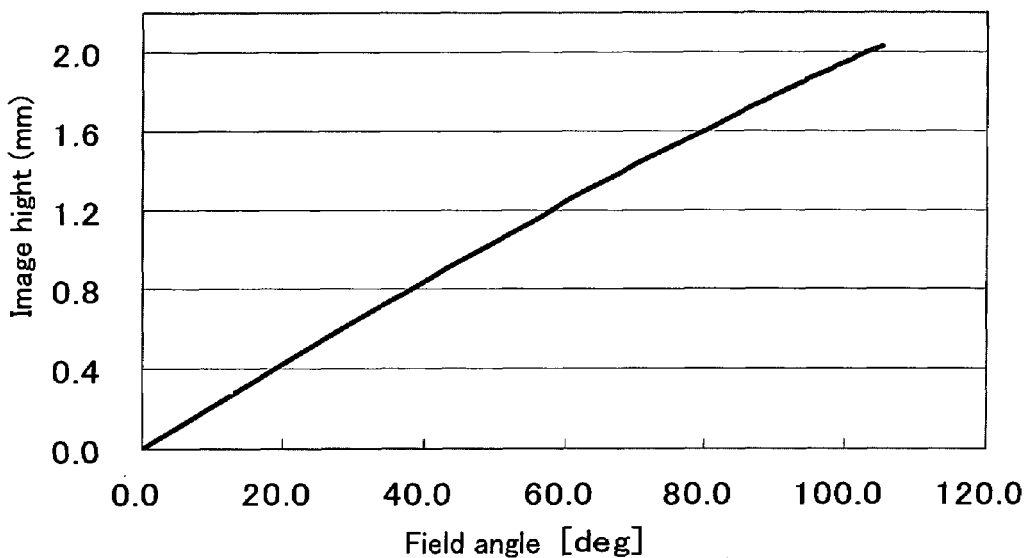
FIG. 8 is illustrative of an angle of view (field angle) vs. image height in Example 2.
Figure 9:
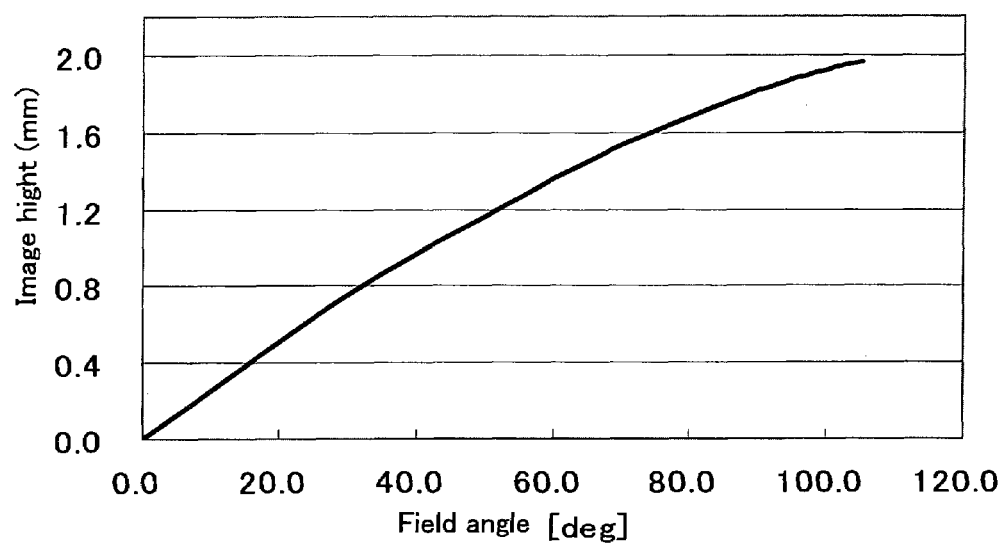
FIG. 9 is illustrative of an angle of view (field angle) vs. image height in Example 3.
Figure 10:
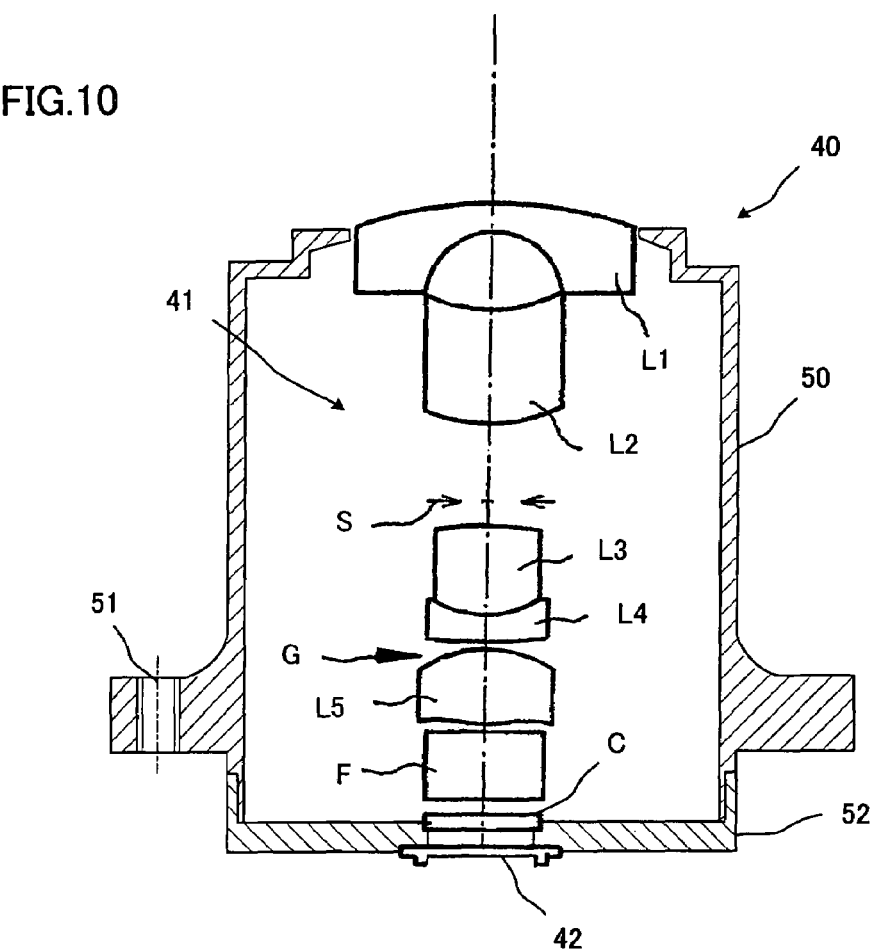
FIG. 10 is illustrative in section of an onboard camera with the inventive image-formation optical system built in it.

10th surface $K = -11.6715$
$A_4 = 1.31766 \times 10^{-2}$
$A_6 = -3.56204 \times 10^{-3}$
$A_8 = 1.56300 \times 10^{-4}$
$A_{10} = 3.28622 \times 10^{-4}$ 11th surface $K = 0.8832$
$A_4 = 1.42340 \times 10^{-3}$
$A_6 = 1.80518 \times 10^{-3}$
$A_8 = -4.80072 \times 10^{-4}$
$A_{10} = 4.08437 \times 10^{-5}$ FIGS. 4, 5 and 6 are aberration diagrams for Examples 1, 2, and 3, respectively. In these diagrams, there is spherical aberration (SA), astigmatism (AS), chromatic aberration of magnification (CC), and distortion (DT) indicated. In FIGS. 1, 2 and 3, "FIY" stands for a half angle of view (°). FIGS. 7, 8 and 9 are illustrative of graphs with the angle of view (field angle) of Examples 1, 2 and 3 as abscissa and image heights as ordinate.

The values of conditions (1) to (9) in Examples 1, 2 and 3 are enumerated below.

| Condition | Example 1 | Example 2 | Example 3 |
|---|---|---|---|
| (1) | −0.07327 | −0.07900 | −0.14539 |
| (2) | 0.34559 | −0.31377 | 0.26071 |
| (3) | 4.31667 | 3.40931 | 4.80484 |
| (4) | 2.09444 | 1.87322 | 2.62974 |
| (5) | 0.88280 | 1.09401 | 0.68056 |
| (6) | 1.92286 | 1.92286 | 1.84666 |
| (7) | −2.42318 | −2.24803 | −3.10727 |
| (8) | 1.88300 | 1.88300 | 1.83400 |
| (9) | −10.379 | −19.845 | −6.7300 |

The lenses formed of plastics in the examples of the invention may just as well be formed of glasses, and the lenses formed of glasses may just as well be formed of plastics. It goes without saying that special low-dispersion glass would work for correction of chromatic aberrations. In particular, the use of low moisture absorption plastic materials (e.g., Zeonex made by Nippon Zeon Co., Ltd.) is preferable because there is a little deterioration in performance due to environmental changes.

To cut off unwanted light such as ghost or flare light, it is acceptable to use a flare stop in addition to the aperture stop. In the examples of the invention, for instance, the flare stop may be interposed somewhere between the object plane and the first lens, between the first and the second lens, between the second lens and the aperture stop, between the aperture stop and the third lens, between the third and the fourth lens, between the fourth and the fifth lens, or between the fifth lens and the image plane. The flare light may also be cut off by a frame or another member, or direct printing, coating or sealing to the optical system in any desired shape such as circle, oval, rectangular, polygonal or function curve shapes. Not only unwanted light beams but also light beams such as coma flares around the image may just as well be cut off.

Further, each lens may be applied with an antireflection coating to hold back ghosts and flares, and each lens surface or the cover glass may be applied with a wavelength cut coating.

To bring the optical system in focus, focusing may be implemented by extending the whole lens system outwards, or extending or retracting a part of the lenses.

A lowering of brightness on the periphery of the image may be staved off by the shifting of the microlenses of CCD. For instance, the design of the CCD's microlenses may be modified in alignment with the angle of incidence of light rays at each image height. Alternatively, the lowering of brightness at the periphery of the image may be corrected by image processing.

It is also acceptable to make correction of distortion occurring through the optical system by means of image processing. Further, the image processing of surrounding images may be implemented in a projection mode adapted to amass information around an image, for instance, an equidistant projection mode.

An inventive image-formation optical system 41 is built in a main body 50 having a threaded portion 51 for attaching an onboard camera 40 to the desired position of a vehicle, and the lower portion of the body 50 is closed up by an imaging device support frame 52 to which CCD 42 is fixedly provided.

The present invention may also be applied to the surveillance camera required to have a wide angle of view.

I claim:

1. An image-formation optical system, comprising, in order from an object side thereof,
   a first lens having negative refracting power,
   a second lens that is a meniscus lens concave on its object side,
   an aperture stop, and
   a lens group having positive refracting power, wherein said image-formation optical system satisfies the following conditions (3) and (4):

$$3.0 \leq D_{r1r4}/Ih \leq 6.0 \qquad (3)$$

$$1.5 \leq D_{r1r3}/Ih \leq 3.0 \qquad (4)$$

where $D_{r1r3}$ is a distance from an object-side surface of the first lens to an object-side surface of the second lens,
   $D_{r1r4}$ is a distance from the object-side surface of the first lens to an image-side surface of the second lens, and
   Ih is a maximum image height.

2. The image-formation optical system according to claim 1, wherein a lens having positive refracting power is located nearest to an image side of the image-formation optical system, and said image-formation optical system satisfies the following condition (2):

$$0.2 \leq Dsp/L \leq 0.5 \qquad (2)$$

where Dsp is a distance between an optical stop and an image-side surface of the positive lens located nearest to the image side of the optical system, and
   L is a distance from the object-side surface of the first lens to an image plane.

3. The image-formation optical system according to claim 1, wherein a lens having positive refracting power is located nearest to the image side of the optical system, and at least one positive lens having positive refracting power is interposed between an optical stop and said positive lens.

4. The image-formation optical system according to claim 1, wherein a lens having positive refracting power is located nearest to the image side of the optical system, and at least one positive lens having positive refracting power and a lens having negative refracting power are interposed between an optical stop and said positive lens.

5. The image-formation optical system according to claim 1, which satisfies the following condition (6):

$$n_2 \geq 1.75 \qquad (6)$$

where $n_2$ is a d-line refractive index of the second lens.

6. The image-formation optical system according to claim 1, which satisfies the following conditions (7) and (8):

$$-4.0 \leq f_1/f \leq -1.0 \qquad (7)$$

$$n_1 \geq 1.75 \qquad (8)$$

where $f_1$ is a focal length of the first lens,
f is a focal length of the whole image-formation optical lens system, and
$n_1$ is a d-line refractive index of the first lens.

7. The image-formation optical system according to claim 1, which satisfies the following condition (9):

$$-30.0 \leq f_{1-2}/f \leq -3.0 \qquad (9)$$

where $f_{1-2}$ is a combined focal length of the first lens and the second lens, and
f is a focal length of the whole image-formation optical system.

8. An imaging system comprising the image-formation optical system according to claim 1, wherein an imaging device is located on an image side of the image-formation optical system for converting an optical image into electric signals.

9. An image-formation optical system, comprising, in order from an object side thereof,
a first lens having negative refracting power,
a second lens that is a meniscus lens concave on its object side,
an aperture stop, and
a lens group having positive refracting power, wherein:
the lens group having positive refracting power comprises:
a lens having positive refracting power,
a lens having negative refracting power, and
a lens having positive refracting power, wherein the lens of negative refracting power in said lens group having positive refracting power is a meniscus lens convex on its image plane side.

10. An image-formation optical system comprising, in order from an object side thereof,
a first lens having negative refracting power,
a second lens that is a meniscus lens concave on its object side,
an aperture stop, and
a lens group having positive refracting power, wherein said image-formation optical system satisfies the following condition (1):

$$-0.2 \leq 2 \times Ih/Exp < 0 \qquad (1)$$

where Ih is a maximum image height, and
Exp is an exit pupil position of the optical system.

11. An image-formation optical system comprising, in order from an object side thereof,
a first lens having negative refracting power,
a second lens that is a meniscus lens concave on its object side,
an aperture stop, and
a lens group having positive refracting power, wherein said image-formation optical system satisfies the following condition (5):

$$0.5 \leq |r_3/r_4| \leq 1.4 \qquad (5)$$

where $r_3$ is a radius of curvature of an object-side surface of the second lens, and
$r_4$ is a radius of curvature of an image-side surface of the second lens.

* * * * *